Aug. 16, 1938.                J. G. TYKEN                2,127,348
                        POWER DRIVING MECHANISM
                         Filed June 27, 1936           2 Sheets-Sheet 2
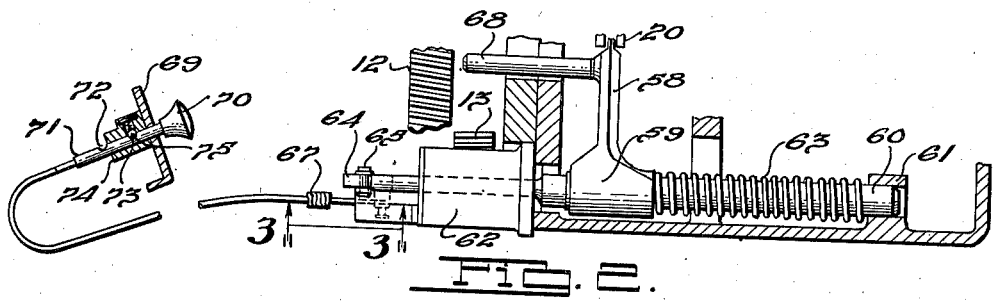
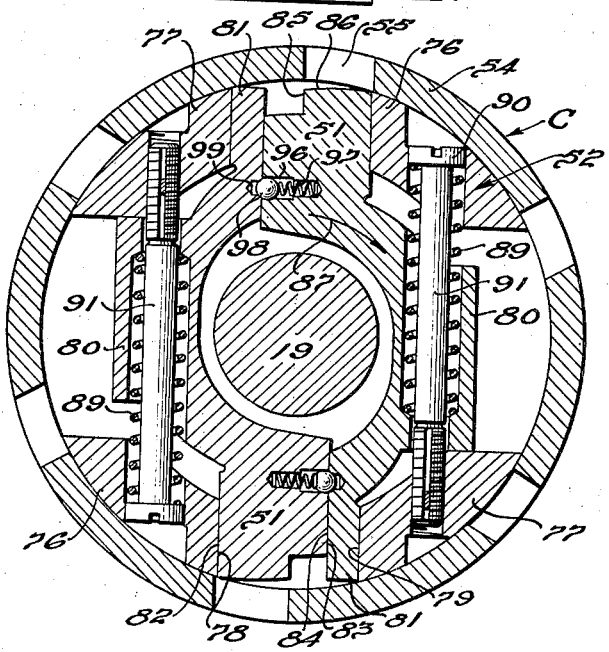
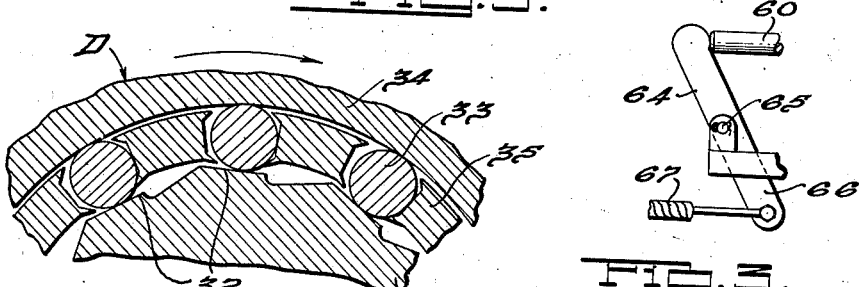
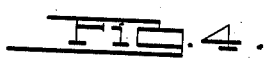
INVENTOR
John G. Tyken.
BY
ATTORNEYS.

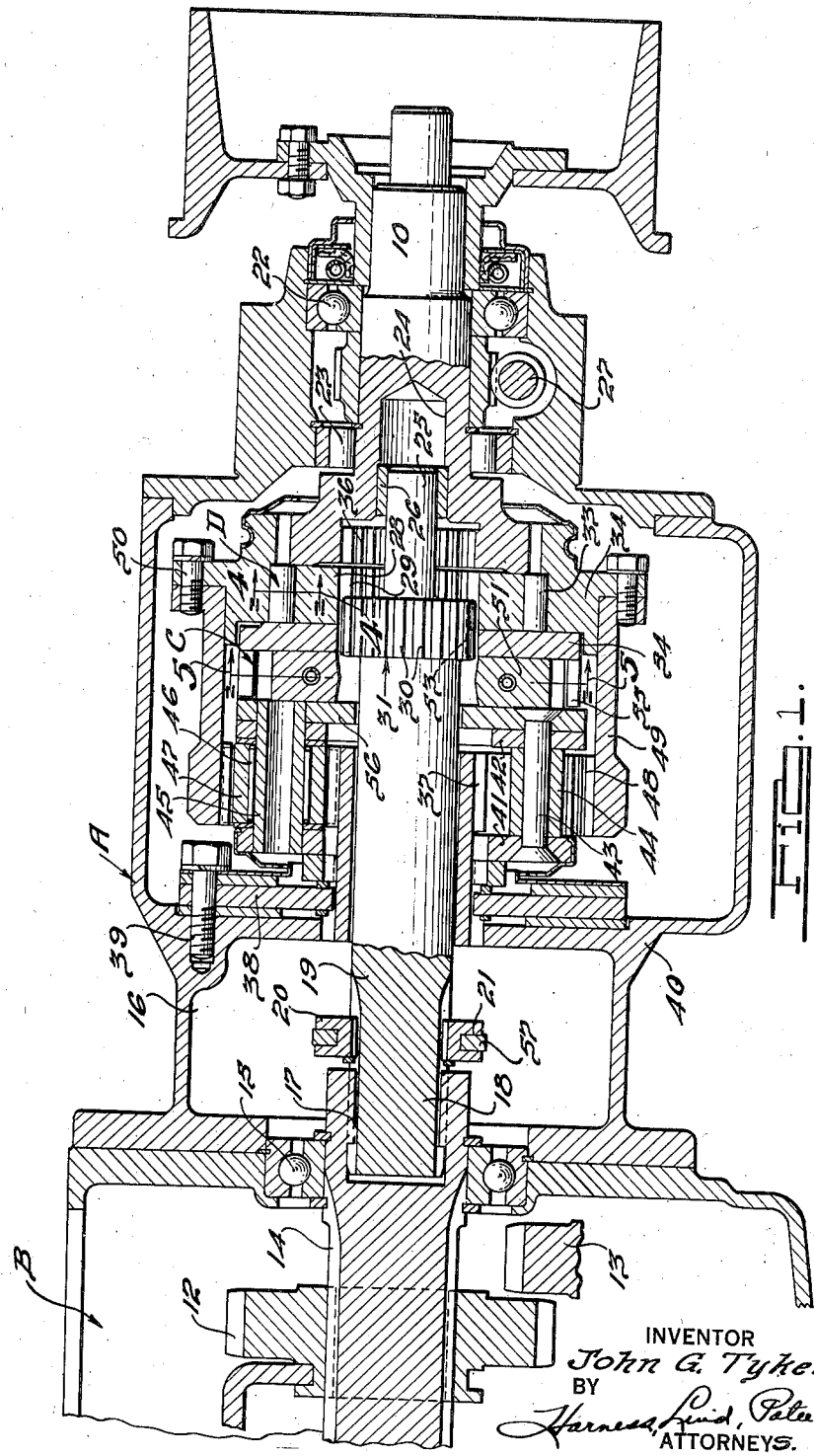

Patented Aug. 16, 1938

2,127,348

UNITED STATES PATENT OFFICE 2,127,348

POWER DRIVING MECHANISM

John G. Tyken, Detroit, Mich., assignor to Chrysler Corporation, Highland Park, Mich., a corporation of Delaware Application June 27, 1936, Serial No. 87,646

3 Claims. (Cl. 74—260)

This invention relates to driving mechanisms and clutches therefor and refers more particularly to improvements in driving mechanisms for motor cars or vehicles, especially where it is desired to vary the driving speed ratio between the vehicle engine or prime mover and the propelling ground wheels.

An object of my invention resides in the provision of an improved driving mechanism and clutch adapted, under predetermined desired conditions, to automatically effect the drive for the vehicle. My driving mechanism is preferably adapted for use in connection with a speed ratio changing transmission of any desired type, and is adapted in one embodiment thereof to establish an auxiliary driving speed ratio for the vehicle, such as an overdrive ratio, for example. Thus, by way of example, I have provided an overdrive of improved construction and operation which may be automatically effective when the vehicle attains a speed at least as high as a predetermined speed so that, on reaching this critical speed, the overdrive may become effective and on falling below this critical speed the overdrive may become ineffective. I have preferably provided in my mechanism, means for controlling the operation of the overdrive mechanism under varying conditions of speeds of the various parts involved and under various controls manual and otherwise, all of which will be hereinafter more apparent.

A further object of my invention resides in the provision of an improved driving mechanism embodying a clutch having one or more pawls, dogs, or clutching members adapted to move into clutching or declutching positions in an improved manner in response to centrifugal forces acting on the pawls. I preferably provide a cage or core adapted to carry a plurality of pawls, and a sleeve or shell provided with suitable slots or openings respectively adapted to receive the pawls for clutching action. One feature of my invention resides in the relationship of the clutch parts with the speed ratio or overdrive gearing.

My improved driving mechanism is particularly adapted for motor cars or vehicles, where it is desired to vary the driving speed ratio between the vehicle engine or prime mover and the propelling ground wheels. Thus, my invention may be used to advantage in transmissions and other driving mechanisms for effecting automatic changes in the driving speed ratio, the slotted shell being preferably driven by the engine and the pawl carrying cage by the vehicle ground wheels. Thus, by relatively driving the clutch members by the engine and car, the action of my clutch is responsive to conditions of car speed to automatically vary the driving speed ratio under desired conditions. If desired, the clutch parts may be changed around as to their aforesaid relationship with the engine and ground wheels.

An additional object of my invention is to provide a novel and improved control for the automatic clutch in relation to the direct drive between driving and driven shafts. Inasmuch as the direct drive includes a one-way clutch, provision must ordinarily be made to lock-out the one-way clutch to provide a two-way direct drive. My control embodies a shiftable clutch member preferably always engageable with one member of the one-way clutch and selectively shiftable, as by a shiftable extension of the driving shaft, to clutch directly with the driven shaft or to establish driving connection with one of the automatic clutch structures, such as the slotted shell, for example. I preferably employ a planetary overdrive gear train wherein the planetary carrier mounts one of the automatic clutch structures, preferably the pawl carrying cage, although the slotted shell may be so mounted if desired. Further objects of my invention reside in the provision of an improved driving mechanism and clutch, and in the novel combination and arrangement of parts thereof more particularly hereinafter described and illustrated in one embodiment in order to illustrate the details and principles of my invention, reference being had to the accompanying drawings, in which:

Fig. 1 is a sectional elevational view through my power driving mechanism.

Fig. 2 is a fragmentary plan view thereof illustrating the controls for locking out the free wheeling clutch, as in reversing the motor vehicle drive.

Fig. 3 is a detail side elevational view taken as indicated by the line 3—3 of Fig. 2.

Fig. 4 is a sectional elevational view through a portion of the over-running or free wheeling clutch, the section being taken along the line 4—4 of Fig. 1.

Fig. 5 is a sectional elevational view through my automatic clutch illustrated in the disengaged condition, the section being taken along the line 5—5 of Fig. 1.

In the drawings, I have illustrated my driving mechanism A interposed between a speed ratio changing transmission B and the driven shaft 10, the latter extending rearwardly to drive the rear wheels (not shown) of the motor car or vehicle in the usual well-known manner, it being understood that I have elected to show my invention in association with a motor vehicle drive although my invention in its broader aspects is not necessarily limited thereto. Furthermore, my driving mechanism may be used to advantage at various other points in the line of general power transmission between the vehicle engine and the driven wheels, or between driving and driven means such as shafts of other types of devices.

The transmission B may be of any suitable type such as the conventional selector type operated in the well-known manner through usual selector controls whereby the various adjustments may be made to the transmission in order to provide the speed ratios in the line of drive through the transmission.

Inasmuch as transmission B may for the most part be of general conventional construction and operation, I have shown only a portion of the gearing of this transmission in Figs. 1 and 2 wherein 12 represents the gear adapted to be shifted by the usual reverse selector control (not shown) rearwardly or to the right as viewed in Figs. 1 and 2 for engagement with the usual reverse idler gear 13 in order to effect a reverse drive from the normal direction of drive to the driven shaft 10. Thus, by appropriate actuation of the usual transmission controls, gears 12 and 13 may be engaged to reverse the drive, it being understood that other manipulations of the transmission mechanism are adapted to selectively produce other desired speed ratio changes in the normal direction of rotation for driven shaft 10.

The power coming from the usual engine or other prime mover (not shown) which may be located forwardly of transmission B, drives the transmission by a power driving means or shaft 14 rotatable in a bearing 15, the shaft having a portion extending rearwardly into the shifting space 16 of the driving mechanism A. This rearwardly extending portion of shaft 14 is provided with a rearwardly opening splined bore 17 adapted to receive the forwardly extending splined end 18 of the shiftable driving shaft 19, shafts 14 and 19 at all times rotating together by reason of the engaging splines 17 and 18. The driving shaft 19 carries a collar 20 having an annular groove 21, this collar being adapted to axially shift the shaft 19 with respect to the shaft 14 as will be more particularly hereinafter apparent.

The driven shaft 10 extends forwardly in bearings 22, 23 and is provided with a forwardly extending bore 24 slidably piloting the rearwardly extending reduced end 25 of shaft 19, a bearing 26 being provided between the bore 24 and the end portion 25. The usual speedometer take-off drive is illustrated at 27.

My driving mechanism A provides, among other things, an auxiliary driving means or mechanism between the driving and driven shafts 14 and 10 respectively, this driving means being preferably of a construction adapted to provide a speed ratio between these shafts of an overdriving character whereby driven shaft 10 may, under certain conditions hereinafter described, be driven from the driving shaft at a speed greater than a direct drive between these shafts, it being understood that the engine and driving shaft 14 will in such instances be relatively slowed down with respect to their normal speed of actuation for a given speed of vehicle travel.

I preferably incorporate in my driving mechanism as a part of the primary driving means between driving shafts 14 and 19 and driven shaft 10, an over-running or free wheeling clutch D best shown in Figs. 1 and 4. This clutch may in itself be of any suitable form, the illustration showing a conventional device in which the inner cam member 28 is driven by internal splines 29 engaged by the splines 30 of a clutch gear 31 formed as a part of the driving shaft 19. The inner cam member 28 has cam faces 32 engaged by cylinders 33 so that by the driving rotation of shaft 19, the high sides of cam faces 32 will wedge the cylinders 33 between cam member 28 and the outer cylindrical driven member 34 of the over-running clutch to establish a direct drive thereto. The usual spacers 35 maintain the cylinders 33 in spaced position, and since the driven free wheeling part 34 is a forward extension of driven shaft 10 as shown in Fig. 1, it will be apparent that whenever the engine or driving shaft 14 slows down, the vehicle and driven shaft 10 may, by reason of the clutch D, overrun the driving shaft, other conditions permitting such action as will be presently apparent.

Intermediate the driven part 34 of the free wheeling clutch D and the bearing 26, the driven shaft 10 is provided with an annular series of internal splined teeth or jaws 36 complementary to the splines 30 of the shiftable clutch 31, the splines 36 and 30 being adapted to interengage when the shaft 19 is shifted rearwardly as will be presently apparent.

Referring now to the auxiliary driving gearing, I have illustrated this gearing as a planetary gearing although if desired other forms of gearing may be employed. In the illustrated embodiment and referring particularly to Fig. 1, the planetary gearing comprises a sun gear 37 fixed by a bracket 38 and fasteners 39 to the casing 40 of the overdrive mechanism A, the shaft 19 freely rotating within this sun gear. A planet carrier is provided with axially spaced rings 41, 42 connected at circumferentially spaced intervals by the tie members 43, the planetary carrier rings 41, 42 being maintained in spaced relationship by sleeves 44 respectively carried by the tie members 43. In Fig. 1, I have illustrated one of these tie members 43 and associated sleeve 44.

Spaced circumferentially between the tie members 43 are the planet gear shafts 45 supported by the rings 41, 42 and journaled by a bearing 46 on each of the shafts 45 is a planetary gear pinion 47 meshing with the aforesaid sun gear 37. The planetary gears 47 also mesh with an internal gear 48 carried by a sleeve 49 which projects forwardly from the outer member 34 of the free wheeling clutch D. The sleeve 49 may be formed as a part of the member 34 or may be rigidly connected thereto as by the fasteners 50 illustrated in Fig. 1. The sleeve 49 has its axis concentric with the axis of shaft 19.

My clutch C, preferably of the automatic type, has its centrifugally actuated pawls or dogs 51 carried by a pawl cage 52 which has an inwardly extending forwardly located plate or flange 56 receiving the rearwardly extending ends of the planetary gear shafts 45 whereby the cage 52 is driven by the planetary gears 47.

The companion cooperating clutch member of the automatic clutch C is provided by a cylindrical shell or sleeve 54 having an annular series of spaced pawl receiving slots or openings 55, the shell 54 having an annular series of internal teeth or splines 53 illustrated in Fig. 1 as being interengaged by the splines 30 of the shiftable clutch gear 31.

The aforesaid annular groove 21 of collar 20 is engaged by a yoke 57, a portion of which is shown in Fig. 1, this yoke extending laterally through an arm 58 as seen in Fig. 2. The arm 58 is provided with a hub 59 fixed to a shiftable rod 60 adapted to reciprocate in guides 61 and 62. The rod 60 receives a spring 63 acting against the guide 61 at one end thereof, the spring 63 yieldingly urging the rod 60 forwardly or to the left as viewed in Fig. 2 by reason of the spring acting against the hub 59. The forward end of rod 60 is engaged by the upper end of a lever arm 64 pivotally mounted at 65 and having a downwardly extending lever arm 66 to which is connected an actuating linkage such as a Bowden wire 67.

The arm 58 has a laterally projecting rod 68 extending into the path of movement of the gear 12 when the latter is moved rearwardly for engagement with the reverse idler gear 13 as aforesaid. The arrangement is such that when the gear 12 is shifted into engagement with gear 13 for establishing the reverse drive, rod 68 will be engaged toward the latter part of the movement of gear 12 to move the rod 68 together with the rod 60 rearwardly or to the right as viewed in Figs. 1 and 2, thereby shifting the collar 20 together with shaft 19 and shiftable clutch gear 31 rearwardly to disengage splines 30, 53 and to engage splines 30, 36 to lock out or render the overrunning clutch D ineffective, splines 30, 29 remaining in engagement for both the forward and rearward shifting positions of shaft 19. During the aforesaid rearward shifting movement of rod 60, spring 63 will be compressed so that on release or forward movement of the gear 12, the parts will be restored to the positions thereof illustrated in Fig. 1 provided however that other controls for the shiftable parts are positioned to accommodate such return movement as will be presently apparent.

In addition to the aforesaid manually operated means for shifting the position of clutch 31 in response to a setting of the reverse gearing of transmission B, I have also provided a further manually controlled means for shifting the clutch 31 independently of the movement thereof under the influence of the reverse setting of the transmission. To this end, the aforesaid Bowden wire 67 as diagrammatically illustrated in Fig. 2 extends for convenient manipulation by the vehicle driver, such position being indicated by the usual dash 69 which mounts a handle or knob 70 connected to the other end of the Bowden wire 67. The handle 70 is adapted for movement by the hand of the vehicle driver, this handle being guided from its position illustrated in Fig. 2 to a position in spaced relationship from dash 69, in which extended position the guide portion 71 of the handle registers a notch 72 thereof with spring pressed ball 73 carried by a guide block 74.

The ball 73 and the notches 72 and 75 engageable therewith cooperate to advise the operator of the proper positioning of handle 70 for effecting the desired movement of the shiftable shaft 19 and clutch 31. In Fig. 2 it will be noted that the ball 73 is illustrated in engagement with the notch 75 and in this position spring 63 is acting to move the clutch 31 forwardly or to the position illustrated in Fig. 1. In this position the splines 30 of clutch 31 are in engagement with the splines 29 of the free wheeling cam member 28 and also with the splines 53 of the slotted shell 54.

It will be noted that when handle 70 is pulled outwardly from dash 69, lever arm 64 will move rod 60 against the tension of spring 63 to shift the clutch 31 to disengage splines 53 and 31 and to engage splines 36 and 30, splines 30 and 29 remaining in engagement as aforesaid, this shifting movement of the clutch 31 under actuation of the handle 70 being independent of a similar clutch shifting movement under the influence of reverse gear 12. It will be apparent that when gear 12 is shifted to engage the reverse gear 13, such movement is effective to shift the clutch 31 rearwardly into engagement with splines 36 as aforesaid, rod 60 separating from its otherwise normally engaging position against lever arm 64 as illustrated in Fig. 3. When the clutch 31 is shifted rearwardly by engagement of notch 72 with ball 73, the clutch device will be maintained in the aforesaid shifted position until the handle 70 is restored to the position illustrated in Fig. 2 whereupon spring 63 will act to restore the clutch to its position illustrated in Fig. 1.

Referring now to the details of my clutch C which is preferably of the automatic type, one embodiment thereof being illustrated in Fig. 5, the pawl cage 52 is provided with diametrically arranged pairs of lateral extensions or pawl guides 76 and 77. Extensions 76 have pawl engaging faces 78 and extensions 77 have similar bearing faces 79. Fitting within shell 54 are a pair of the said pawls 51, each having a face in sliding engagement with a face 78 of extension 76 and each extending generally inwardly of the pawl carrying cage. Thus, each pawl is formed with a yoke portion 80 normally seated on an extension 77, each yoke portion having a guide counterbalancing portion 81 slidable intermediate a face 79 and the sides of the other pawl opposite the sides thereof in engagement with the face 78.

The face or side of each pawl 51 which slides against a face 78 has been designated by reference character 82 and this side of the pawl may be referred to as the coast side. The opposite side or face of each pawl 51 is indicated at 83 in sliding contact with the face 84 of the guide portion 81 of the other associated pawl. The drive side or face of each pawl 51 is indicated at 85 and it will be noted that this side 85 is offset from the side 83. Each pawl 51 has an outer cam face 86, it being noted that the drive side is spaced somewhat farther from the inner surface of shell 54 than the spacing of the outer extremity of the coast side 82, when the clutch C is disengaged as shown in Fig. 5, so that the cam face 86 may be said to extend forwardly and radially inwardly of the direction of rotation of the clutch as indicated by the arrow 87 in Fig. 5.

In order to normally urge the pawls 51 inwardly of the pawl cage 52 to position the parts as shown in Fig. 5, yielding means such as springs 89 are provided, each spring acting on the head 90 of a screw bolt 91 threadedly engaging suitable openings in extensions 77, the yoke portions 80 being also provided with suitable openings to slidably receive the respective bolts 91 and springs 89 cooperating therewith. Thus, the heads 90 of bolts 91 provide abutments for the springs 89, these springs respectively acting at their operating ends on the yoke portions 80 of the pawls.

The shell 54 has the aforesaid plurality of circumferentially spaced pawl receiving slots or openings 55 suitably spaced so that diametrically arranged pairs of slots will simultaneously register with the pawls 51 to receive said pawls under conditions hereinafter more apparent.

The threaded ends of screw bolts 91 permit adjustment of the springs 89 when the heads 90 of the bolts are registered with one of the slots 55 of shell 54, it being understood that the sleeve 49 and casing 40 may have one or more aligned openings adapted for alignment with one of the slots 55 at the time of registration therewith of a bolt head 90 whereby adjustment of the primary springs 89 may be effected from without the overdrive casing, the aligned openings in the aforesaid sleeve and casing not being illustrated in my drawings.

When pawls 51 move outwardly into slots 55, such movement is limited by engagement of yoke portions 80 with projections 76, the yoke portions sliding on bolts 91.

Each pawl 51 may be formed with a pocket 96 opening toward a face 84 of the associated counterbalancing guide portion 81 of the other pawl, each pocket 96 receiving yielding means which may be in the form of a spring 97. Each spring 97 acts on a ball 98 movably housed within opening 96 adjacent the other end thereof. Each face 84 is provided with an inner ball receiving detent 99, it being noted that when the pawls move outwardly together, the pawl 51 and associated guide 81 of the other pawl move in opposite directions and to the same extent. These detents prevent "hunting" of the pawls and insure their quick clutching movement.

In the operation of my improved driving mechanism and clutch, according to the aforesaid illustrated embodiment thereof, let it be assumed that the parts are positioned as indicated in Figs 1 to 5, inclusive. This position of parts is the normal driving condition of the vehicle wherein the overdrive may take place. Thus, the drive coming from the engine and thence through transmission B passes from transmission driving shaft 14 to the driving shaft 19, the drive then being transmitted through clutch 31 to the free wheeling cam 28, through the free wheeling clutch D and thence to the outer free wheeling member 34 and driven shaft 10 to the vehicle driving ground wheels. Uunder such conditions the motor vehicle will be directly driven for a one-way drive between driving and driven shafts 14 and 10 respectively, the driven shaft 10 overrunning the driving shaft 14 whenever the engine and driven shaft are slowed down below the speed which is required to establish a drive to the motor vehicle.

By reason of an appropriate selection and setting of the springs 89 and also by an appropriate selection of spring characteristics for the springs 97, the operation of the automatic clutch C may be varied as desired within wide limits of engagement and disengagement of clutch C and it is not my intention to limit my invention to any particular speed responsive characteristic of my clutch. In order to more clearly explain a typical operation of the automatic clutch, and by way of example, let it be assumed that it is desired to establish engagement of clutch C when the motor vehicle is driven at approximately 40 miles per hour.

With the parts positioned in Fig. 1, the vehicle is driven to or above 40 miles per hour, the slots rotating faster than the pawls since the gear train acts as a reduction gearing from driven shaft 10 to the pawl cage 52. On reaching the critical speed of release of the pawls 52, the pawls tend to fly out but engagement of the pawls in the slots 55 will be prevented by reason of the fact that the pawls do not have time to move outwardly to engage the slots as they rapidly rotate past the successive slots. Furthermore, the cam faces 86 of the respective pawls are so arranged as illustrated in Fig. 5 that the high sides of these cam faces hold the pawls inwardly so that as the pawls move relatively across the slots the pawls are smoothly rotated without objectionable noise or wear and the pawls will continue to pass the slots 55 without engagement therewith until the rotational speeds of the shell and pawl cage are substantially synchronized as follows.

After the vehicle is driven at the aforesaid speed of 40 miles per hour or at a greater speed, let it be presumed that the operator of the motor vehicle desires to effect engagement of the automatic clutch C to drive the motor vehicle with the overdrive in operation. The driver will then diminish or release the power from the engine by withdrawing his foot from the usual accelerator pedal and the speed of the engine will thus rapidly decelerate although, by reason of the over-running clutch D, the motor vehicle will continue to travel at the aforesaid assumed illustrative speed of 40 miles per hour, it being presumed for the moment that the motor vehicle is traveling on a level roadway without decelerating or retarding influences. As the engine decelerates, the slots 55 will likewise decelerate, the pawls smoothly passing within the shell and beyond the successive slots 55 until the engine has decelerated to substantially the speed of the pawls 51. The shell 54 and cage 52 being substantially synchronized, the pawls 51 being urged outwardly under centrifugal force, the pawls move outwardly in a pair of the slots 55 and the automatic clutch C is thereby smoothly engaged, the motor vehicle now driving the shaft 19 and the engine through the planetary gearing, the free wheeling clutch D permitting over-running between the vehicle and engine.

With the automatic clutch C engaged, the driver of the motor vehicle may now open the engine throttle as by depressing the usual accelerator pedal, the driving shafts 14 and 19 being thereby accelerated under power. The motor vehicle is now in the overdriving condition, the driven shaft 10 being driven for a two-way drive through the auxiliary planetary gearing and the clutch D providing over-running between the outer and inner clutch parts by reason of the difference in speeds of these parts. Thus, the drive passes from driving shafts 14 and 19 through clutch 31, slotted shell 54 to the pawl 51 and pawl cage 52. From the cage 52 the drive passes to the planetary gears 47, these gears serving to rotate the sleeve 49 and driven shaft 10 at a speed greater than that of driving shafts 14 and 19 by the amount of overdrive ratio afforded by the auxiliary gearing. The automatic clutch C will remain in engagement as the vehicle is accelerated above the aforesaid 40 miles per hour at which the clutch engagement was presumed to have occurred, and the disengagement or release of the overdrive and automatic clutch is effected as follows.

On decelerating, with the motor vehicle coasting and driving the engine through the auxiliary planetary gearing, the pawls will be retracted at some vehicle speed less than the aforesaid critical speed and this may be in the neighborhood of 30 miles per hour. During such coasting action on deceleration, the retraction of the pawls is delayed somewhat below the speed where springs 89 would otherwise act, by reason of the friction of drive established at the coast sides of the slots acting against the coast sides 82 of the pawls in driving the engine. This friction is largely static, holding the pawls against initial retracting movement. Ordinarily, the pawls will be quickly released somewhat earlier on the coasting deceleration than the aforesaid 30 miles per hour of vehicle travel in the event that the accelerator is depressed so that the engine is made to drive the vehicle whereby the aforesaid friction at the coast sides of the slots and pawls is relieved, but in any event the pawls will automatically retract at a sufficiently low speed of the pawl cage determined by the springs 89.

In the foregoing description of the operation of my driving mechanism, it has been presumed that the parts were positioned as shown in Fig. 1, reference being made particularly to the position of shifting clutch 31 which has been presumed to have remained in driving engagement with the shell 54 and the free wheeling cam 28. When the motor vehicle is driven in reverse, the shifting clutch 31 is moved as aforesaid to connect shaft 19 not only with the free wheeling cam 28 but also directly to the driven shaft 10 by reason of engagement of splines 30 and 36. Thus, the free wheeling clutch D is rendered ineffective and the shell 54 is released from driving connection with shaft 19. The latter is of particular significance when, instead of clutch 31 being shifted by the transmission reversing mechanism, the motor vehicle driver desires to render the automatic clutch ineffective, he pulls the handle 70 to engage notch 72 with ball detent 73, such action shifting clutch 31 independently of the transmission reversing mechanism to drivingly engage splines 30 with splines 29 and 36. Under such conditions the automatic clutch C is rendered ineffective inasmuch as the shell 54 is no longer drivingly connected with driving shafts 14 and 19, and the motor vehicle is then driven in direct drive from driving shafts 14 and 19 to driven shaft 10, the over-running clutch D being also thereby rendered ineffective for free wheeling purposes. When the handle 70 is restored to the position indicated in Fig. 2, the spring 63 will act to again move the shifting clutch 31 forwardly to the position illustrated in Fig. 1.

If desired, a further notch may be provided in the handle stem 71 intermediate the notches 72 and 75 to position the shifting clutch 31 for engagement of splines 30 with splines 29 only, whereby the motor vehicle can be driven directly from driving shaft 19 to driven shaft 10 through the free wheeling clutch D and over-running action of driven shaft 10 may occur with respect to driving shaft 19 although I have not illustrated such further positioning of the shifting clutch 31.

With my driving mechanism, it is possible to accelerate the motor vehicle to its top speed, if desired, with clutch 31 positioned as in Fig. 1, and without driving the vehicle through the auxiliary overdriving mechanism. However, under such conditions, whenever the vehicle is allowed to free wheel to momentarily slow down the slots to the speed of the pawls, the automatic clutch will engage.

I do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. The combination with a driving shaft and a driven shaft, of a gearing for establishing a drive from the driving shaft to the driven shaft at a different speed than that of the driving shaft, a clutch arranged to automatically establish a two-way drive between said shafts through said gearing when said shafts reach a predetermined speed, said automatic clutch comprising clutching structures one having a slot for receiving the other when the latter is actuated by centrifugal force, a one-way clutch for establishing a one to one drive between said shafts, a two-way clutch for establishing a one to one drive between said shafts independently of said one-way clutch, and means within the control of the operator for selectively engaging said two-way clutch or engaging said one-way clutch and connecting said slotted clutching structure with the driving shaft.

2. The combination with a driving shaft and a driven shaft, of a gearing for establishing a drive from the driving shaft to the driven shaft at a different speed than that of the driving shaft, a clutch arranged to automatically establish a two-way drive between said shafts through said gearing when said shafts reach a predetermined speed, said automatic clutch comprising clutching structures one having a slot for receiving the other when the latter is actuated by centrifugal force, a one-way clutch for establishing a one to one drive between said shafts, a two-way clutch member carried by the driven shaft, said driving shaft having a shiftable driving extension provided with clutch teeth, and means within control of the operator for shifting said shaft extension to selectively engage the clutch teeth thereof with said two-way clutch member or with said slotted clutching structure and one of the members of said one-way clutch.

3. In a transmission, the combination with a driving shaft and a driven shaft, of a planetary gearing including a pinion carrier for driving said driven shaft from the driving shaft at a greater speed than the driving shaft, a clutch member mounted on the pinion carrier of said planetary gearing, a second clutch member, centrifugally operated means for moving the first said clutch member into engagement with the second said clutch member when the speed of said shafts reaches a predetermined point, means for establishing a two-way direct connection between said shafts for a direct drive and disconnecting the second said clutch member from the driving shaft, said last mentioned means being adapted to connect the second said clutch member with the driving shaft when said direct connection between said shafts is broken.

JOHN G. TYKEN.